US005556078A

United States Patent [19]

Kubota et al.

[11] Patent Number: 5,556,078

[45] Date of Patent: Sep. 17, 1996

[54] MANUAL HOIST AND TRACTION MACHINE

[75] Inventors: Haruo Kubota; Yoshio Nishi; Yoshio Ueno; Yasuo Wada; Munenobu Honda, all of Osaka, Japan

[73] Assignee: Elephant Chain Block Company Limited, Osaka, Japan

[21] Appl. No.: 165,705

[22] Filed: Dec. 13, 1993

[30] Foreign Application Priority Data

| | | | |
|---|---|---|---|
| Dec. 16, 1992 | [JP] | Japan | 4-336141 |
| Dec. 3, 1993 | [JP] | Japan | 5-304222 |

[51] Int. Cl.$^{6}$ .............................. B66D 1/14; B66D 5/02; F16D 55/02; B60T 11/10

[52] U.S. Cl. .................. 254/368; 188/71.2; 188/251 M; 188/251 A; 254/357; 254/375

[58] Field of Search .................................... 254/346, 347, 254/357, 358, 368, 375; 188/251 M, 251 R, 251 A, 71.2

[56] References Cited

U.S. PATENT DOCUMENTS

| | | | |
|---|---|---|---|
| 1,729,262 | 9/1929 | Chappelka | 254/358 X |
| 3,885,006 | 5/1975 | Hatch et al. | 264/29 |
| 4,218,361 | 8/1980 | Searfoss et al. | 260/38 |
| 4,221,364 | 9/1980 | Nishimura | 254/358 X |
| 4,420,067 | 12/1983 | Yamamoto et al. | 188/251 M X |
| 4,452,649 | 6/1984 | Yoshioka et al. | 188/251 M X |
| 4,512,555 | 4/1985 | Nakamura | 254/357 X |
| 4,605,105 | 8/1986 | Ogiwara | 188/251 M |
| 4,664,357 | 5/1987 | Nishimura | 254/357 X |
| 5,266,395 | 11/1993 | Yamashita et al. | 188/251 R X |
| 5,330,036 | 7/1994 | Nishi et al. | 188/251 M |
| 5,339,931 | 8/1994 | Jacko et al. | 188/251 M |

FOREIGN PATENT DOCUMENTS

| | | |
|---|---|---|
| 0131380 | 1/1985 | European Pat. Off. . |
| 0540136 | 5/1993 | European Pat. Off. . |
| 54-39231 | 11/1979 | Japan . |
| 691679 | 5/1953 | United Kingdom . |

*Primary Examiner*—Michael R. Mansen
*Attorney, Agent, or Firm*—Watson Cole Stevens Davis, PLLC

[57] ABSTRACT

A manual hoist and traction machine wherein an outer diameter of a first lining plate constituting a mechanical brake is made smaller than an inner diameter of a driven disc of a handwheel. The outer diameter of a second lining plate and of a driven disc are made smaller than an inner diameter of a cylindrical portion of a braking ratchet wheel, and the first and second lining plates are formed of a lining raw material having improved performance with a compressive strength of 15 (Kgf/mm$^2$) or more and a maximum strain of 12 ($10^{-3}$ mm/mm) or more.

10 Claims, 6 Drawing Sheets

MANUAL HOIST AND TRACTION MACHINE

FIELD OF THE INVENTION

The present invention relates to a manual hoist and traction machine, and more particularly to a manual hoist and traction machine which is provided with a manually driving member mainly comprising a handwheel and with a mechanical brake operated by the manually driving member so that the manually driving member operates to rotatably drive a load sheave to hoist, haul, or lower a load, or to release traction thereof.

BACKGROUND OF THE INVENTION

The conventional manual chain block, one of the manual hoist and traction machines, has been well-known as disclosed in, for example, the Japanese Utility Model Publication Gazette No. sho 54-39231.

The manual chain block disclosed in the above Gazette is so constructed that a driving shaft is supported between side plates through a pair of bearings, a load sheave in association with the driving shaft through a reduction gear mechanism is rotatably supported to the driving shaft, a driven member having at one side thereof a driven disc is coupled with the driving shaft, a boss of a handwheel is screwably mounted thereto, and a braking ratchet wheel engageable with a braking pawl and a pair of lining plates positioned sandwiching therebetween the braking ratchet wheel, are supported at the outer periphery of a cylindrical portion of the driven member, so that these members constitute a mechanical brake. A hand chain engaging with the handwheel is adapted to operate for rotatably driving the driving shaft through the mechanical brake and drive the load sheave to hoist a load or release the mechanical brake to lower the hoisted load.

The manual chain block constructed as the above-mentioned, however, uses a usual lining plate commercially available as a brake lining for a bicycle or the like for the lining plate to be used in the mechanical brake. Therefore, a diameter of the lining plate is made approximately equal to that of the handwheel at the handwheel and opposite to the side surface of the wheel.

The brake lining generally used for industrial machines, even when it has the most superior in properties, may have a coefficient of friction of 0.20 or more at a friction surface temperature of 200° C. in consideration its function, and compressive strength may be 1000 (kg/cm$^2$) at the largest and the maximum strain about 8 ($10^{-3}$ mm/mm), which will comply with the provisions of an applicable Japanese Industrial Standard. When the usually commercial product is used for the mechanical brake of a manual chain block, in consideration of performance and quality, the lining plate is made larger in diameter, the friction surface of the wheel opposite to the lining plate increases in area and decreases in surface pressure, so that the mechanical brake is adapted to operate corresponding to a hoist load without hindrance.

Meanwhile, such a manual chain block has recently been required to be small-sized for the sake of simplicity in handling, which is realized by improving the quality of material of each component to raise its durability. However, the handwheel is limited in its diameter because of a limit to a diameter of the lining plate, thereby being restricted in its miniaturization. Also, the axial position of the handwheel needs to be set at the axially outside of the mechanical brake so that the axial size of the handwheel also is limited in the miniaturization thereof. When the handwheel is axially outwardly positioned, a distance between the mounting portions of the handwheel and bearing for supporting the driving shaft to the side plates, so that, when the handwheel is driven by the hand chain, the driving shaft is easy to deflect due to a load acting on the handwheel. Hence, in some cases where the hand-chain is forcibly operated, a problem is created in that the driving shaft is deformed. Also, in the no-load state where a hook at the load chain engaged with the load sheave hangs no load and the load sheave is not affected by the load, the body of chain block, as shown by the two-dot chain line in FIG. 7, is slanted due to weight of the hand chain engageable with the handwheel, whereby, when the hand chain 100 is operated to rotate the handwheel 101, not only the hand chain 100 comes into contact with a wheel cover 103 at the chain block body 102 so as to generate noises, but also resistance is generated against the operation of hand chain 100. Hence, there is no inertia resistance of handwheel 101 caused by the operation of hand chain 100, so that the hand chain 108 cannot quickly rotate the hand wheel 101, thereby creating the problem in that the hook of the load chain cannot be lifted rapidly.

SUMMARY OF THE INVENTION

An object of the present invention is that in a manual chain block having a handwheel, the number of chain pockets on the handwheel can be minimized and also the wheel of the handwheel is lapped on the mechanical brake so that the handwheel can be axially positioned in proximity to a side of the side plate for supporting the load sheave and moreover a diameter of the wheel can be small so as to enable the chain block to be miniaturized.

Another object of the present invention is that in a manual hoist and traction machine including the above-mentioned manual chain block, the friction surface of the mechanical brake or an overload prevention device is improved to stabilize the performance thereof.

In order to attain the above-mentioned objects, a manual hoist and traction machine which is provided with first and second side plates, a load sheave supported therebetween through a pair of bearings, a driving shaft for driving the load sheave, a driven member coupled with the driving shaft and having the friction surface, and a driving member screwably mounted on the driving shaft and having a friction surface opposite to that of the driven member, and which is also provided between the driven member and the driving member with a mechanical brake having at both axial sides thereof the friction surfaces and the outer peripheral portion with which a braking pawl is engageable, and first and second lining plates interposed between the friction surfaces of the driven member and braking ratchet wheel and between the friction surfaces of the braking ratchet wheel and driving member respectively, is characterized in that the lining plates each are formed of a lining raw material comprising heat-resistant fiber, a friction regulating agent and a bonding agent, and having performance such that, when the mechanical brake operates due to a forward screw movement of the driving member, the raw material having a friction coefficient of 0.35 or more at a temperature of 200° C. of the respective friction surfaces, compressive strength of 15 (kgf/mm$^2$) at hardness (HRS) of 90 to 120, and the maximum strain of 12 ($10^{-3}$ mm/mm) or more.

The present invention is further characterized in that at the manual chain block in which the driving member comprises a handwheel provided with a wheel and a boss screwably mounted to the driving shaft and with a hand chain engageable with the wheel of the handwheel, a friction surface is provided at the side surface of the boss at the mechanical brake side; the wheel has a minimum number of pockets for receiving therein horizontal links of the hand chain and is provided at its inside surface with an inside swollen portion extending from the friction surface toward the first side plate, and furthermore, an outer diameter of the first lining plate is smaller than an inner diameter of the inside swollen portion at the wheel, the braking ratchet wheel is provided with a cylindrical portion extending from the outer periphery thereof toward the first side plate, the cylindrical portion is provided at the outer periphery thereof with teeth engageable with the braking pawl, and the teeth are displaced toward the first side plate with respect to the inside swollen portion of the wheel, and furthermore outer diameters of the second lining plate and driven member with the friction surface are made smaller than the inner diameter of the cylindrical portion at the braking ratchet wheel.

The cylindrical portion at the braking ratchet wheel is to preferably overlapped on the outer periphery of the bearing supporting the load sheave to the first side plate. Also, it is preferable that, among the friction surfaces with which the first and second lining plates come into frictional contact because they are axially biased by forward screw movement of the handwheel, the friction surfaces provided on at least the driven member and braking ratchet wheel are each provided with a friction control layer which is plated and heat-treated.

Furthermore, the present invention is still further characterized in that in the manual chain block wherein the the driving member comprises a brake holder screwably mounted to the driving shaft and having a flange having at the inside surface a friction surface and a cylindrical portion, a handwheel having a boss having frictional surfaces at both axially side surfaces and an inside swollen portion and rotatably supported to the cylindrical portion at the brake holder, and a hand chain engageable with the handwheel; a load setting and adjusting member is screwably mounted to the cylindrical portion of the brake holder, a first friction plate is interposed between the flange of the brake holder and the boss of the handwheel, a second friction plate is interposed between the boss and the load setting and adjusting member, and a holding plate and an elastic member are interposed between the second friction plate and the load setting and adjusting member to thereby form an overload prevention device, and also the respective outer diameters of the flange at the brake holder and first and second friction plates are made smaller than the inner diameter of the inside swollen portion at the handwheel.

It is preferable that in the overload prevention device, the respective outer diameters of the elastic member, holding plate and load setting and adjusting member are made smaller than the inner diameter of the axially outside extended portion at the handwheel and the overload prevention device is adapted to be contained in a plane of projection of both the axially side surfaces and the wheel of the handwheel.

Also, it is preferable that, in the manual hoist and traction machine provided with the overload prevention device, at the friction surfaces of at least the flange at the brake holder and of the holding plate among the friction surfaces with which the first and second friction plates cone into frictional contact is provided with a friction control layer formed of a heat-treated plated layer.

The present invention is yet further characterized in that in a lever type hoist and traction machine, the driving member comprises a brake holder screwably mounted to the driving shaft and having a flange having at the inside surface the friction surface and a cylindrical portion, a driving gear having a boss having at both axial side surfaces friction surfaces and teeth positioned at the outer periphery, and an operating lever having a driving pawl engageable with the teeth at the driving gear, an overload setting and adjusting member is screwably mounted to the cylindrical portion at the brake holder, a first friction plate is interposed between the flange of the brake holder and the boss of the driving gear, a second friction plate is interposed between the boss of the driving gear and the load setting and adjusting member, and a holding plate having the friction surface and an elastic member are interposed between the second friction plate and the load setting and adjusting member to thereby form an overload prevention device, and also the respective friction surfaces of the flange at the brake holder, driving gear and holding plate are provided with friction control layers each formed of a heat-treated plated layer.

Also, it is preferable that in the aforesaid lever type hoist and traction machine, the plated layer at the friction control surface is formed of nickel phosphorus, nickel chromium, or chromium, and that the heat-treatment temperature of the plated layer is set to an austenite transformation point temperature at the respective raw materials of the brake holder, driving gear and holding plate provided with the layer and the plated layer being diffused onto the surface of each raw material.

Therefore, according to the invention as set forth herein, the first and second lining plates 13 and 14 at the mechanical brake 17 are formed of the above-mentioned lining raw material, whereby an outer diameter of the respective lining plates 13 and 14 can be smaller. Accordingly, when the present invention is applied to the manual chain block having a handwheel 11 as in the embodiment shown in FIG. 1, the handwheel 11 can be smaller in diameter thereof to thereby enable the chain block to be miniaturized as a whole.

Also, according to the invention as set forth herein, in the manual chain block provided with the handwheel 11, a friction surface 19*a* is provided at the side surface of the boss 19 of the handwheel 11 at the mechanical brake side, the number of pockets at the wheel 20 at the handwheel 11 is minimized, at the inside thereof, that is, at the side surface at a side of the first side plate 13 is provided an inside extending portion swollen beyond the friction surface 19*a* toward the first side plate, an outer diameter of the first lining plate 13 is made smaller than an inner diameter of the inside swollen portion, the cylindrical portion is provided at the braking ratchet wheel, the teeth are provided at the cylindrical portion and displaced from the inside swollen portion toward the first side plate, and the outer diameters of the second lining plate and driven member which is provided with the friction surface are made smaller than the inner diameter of the cylindrical portion, whereby while enabling the handwheel 11 to be smaller in diameter, the handwheel can be axially displaced toward the load sheave, in other words, the side plate supported to the load sheave. Accordingly, the handwheel can be made smaller in size not only radially but also axially, thereby enabling the chain block to be miniaturized and also the driving shaft 7 to be less deflected, and the entire chain block when no-loaded can be less slanted and the handwheel is inertial-rotatable, whereby the hand chain can be operated smoothly, rapidly, and without noises.

Accordingly to the invention as set forth herein, the cylindrical portion 21 of the braking ratchet wheel 12 is overlapped on the outer periphery of the bearing 6 for supporting therethrough the load sheave 3 to the second side plate, whereby the braking pawl 16 engageable with the teeth 15 at the cylindrical portion 21 can be displaced toward the side plate so that the handwheel 11 also can be displaced toward the same to that extent, thereby enabling the chain block to be further reduced in axial length and the driving shaft 7 to be reduced in deflection when the handwheel 11 is driven, and the chain block as a whole can be less slanted during the no loading.

According to the invention as set forth herein, the friction control layer 26 is provided at the friction surface, whereby, while forming the lining plate 13 and 14 of the lining raw material, the resistance of the friction surface to attack is improved and the coefficient of friction is controllable, whereby, even in long use, the coefficient of friction of the friction surface can be stabilized and the braking property can be prevented from being varied after long use, thereby enabling stable use to be performed for a long time.

Furthermore, according to the invention as set forth herein, in the chain block assembling therein the overload prevention device 30, since the outer diameter of the flange 32 and those of the friction plates 35 and 36 at the brake holder 31 are made smaller than the inner diameter of the inside swollen portion at the wheel 20 of the handwheel 11, the friction plates 35 and 36 can be contained in the plane of projection of the wheel 20 at the handwheel 11, whereby, while providing the overload prevention device 30, the handwheel 11 can further be reduced in axial length and miniaturized as a whole.

According to the invention as set forth herein, the outer diameter of the elastic member 37, holding plate 38 and load setting and adjusting member 34 at the overload prevention device 30 are made smaller than the inner diameter of the wheel 20 and the overload prevention device 30 is contained in the plane of projection at the wheel 20, whereby, while providing the overload prevention device 30, the chain block can effectively be prevented from increasing in axial length due to the overload prevention device 30.

According to the invention as set forth herein, the manual chain block and lever-type hoist and traction machine each are provided at the friction surface of the overload prevention device 30 with the friction control layer 39, whereby the coefficient of friction of the friction surface is controllable to be a desired value, a transmitting torque by the load setting and adjusting member 34 can accurately be set, variation between products is eliminated, and the surface condition of the friction surface is never changed by corrosion attack on friction plates 35 and 36. Also, the hoist and tracation machine is not affected by rust, thereby enabling the set value of transmitting torque to be held to a proper value for a long time. Hence, the load sheave is ensured to slip by an overload more than the set value on the basis of the prest transmitting torque so as to effectively realize the overload prevention.

According to the invention as set forth herein, the heat-treatment temperature of the plated layer is set to an austenite transformation point temperature of the driving side and driven side members 10, 8 and 16 for forming the plated layer and the plated layer is diffused and permeated onto the raw material surface of the respective driving side and driven side members 10, 8 and 16, whereby the surface hardness can be made to be 600 or more of Vickers hardness. Accordingly, the corrosion attack resistance and durability can further be improved and the set value of the transmitting torque can be held effectively and for a long time.

These and other objects of the invention will become more apparent in the detailed description and examples which follow.

DETAILED DESCRIPTION OF THE DRAWINGS

Figure 1:
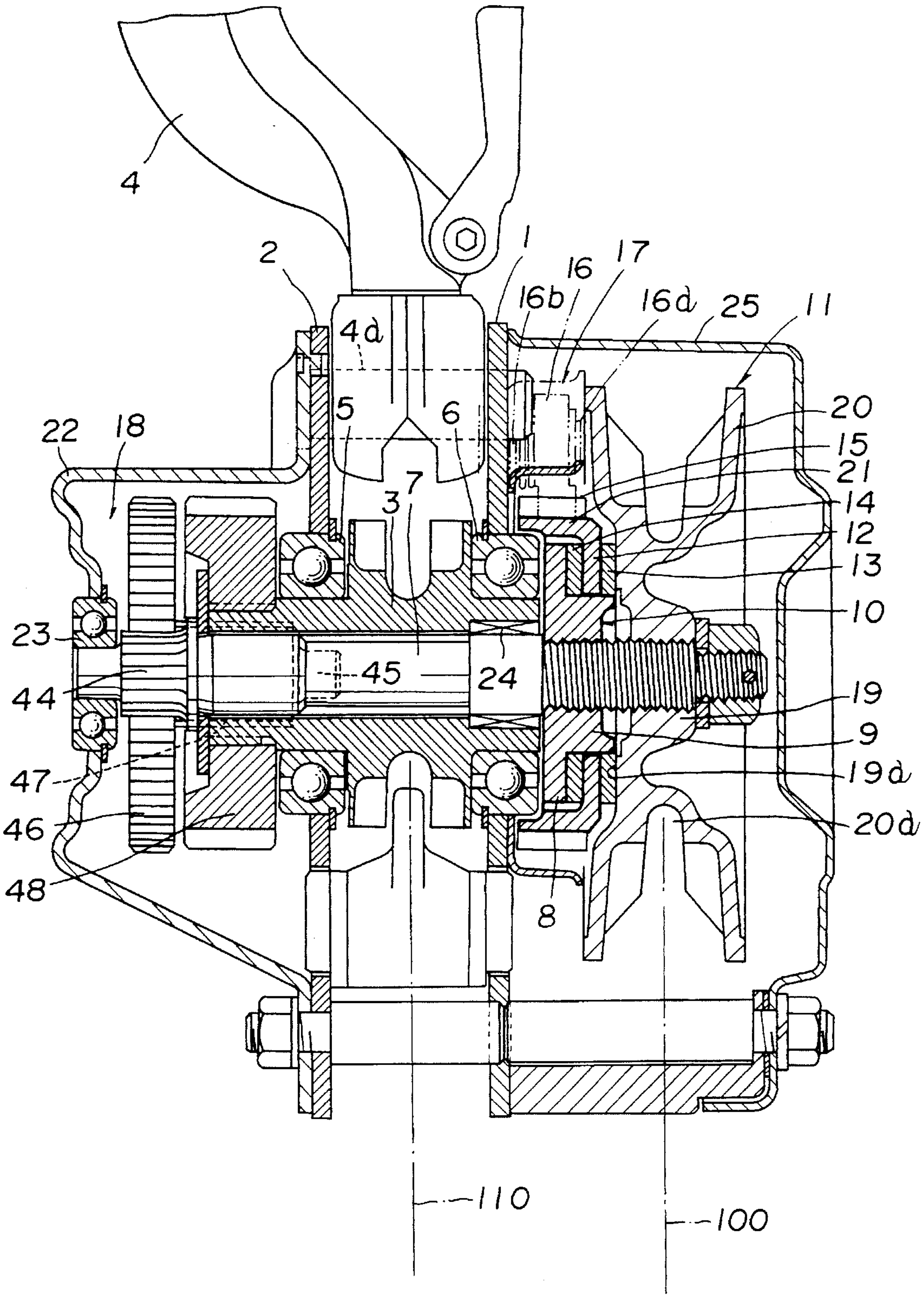
Figure 2:
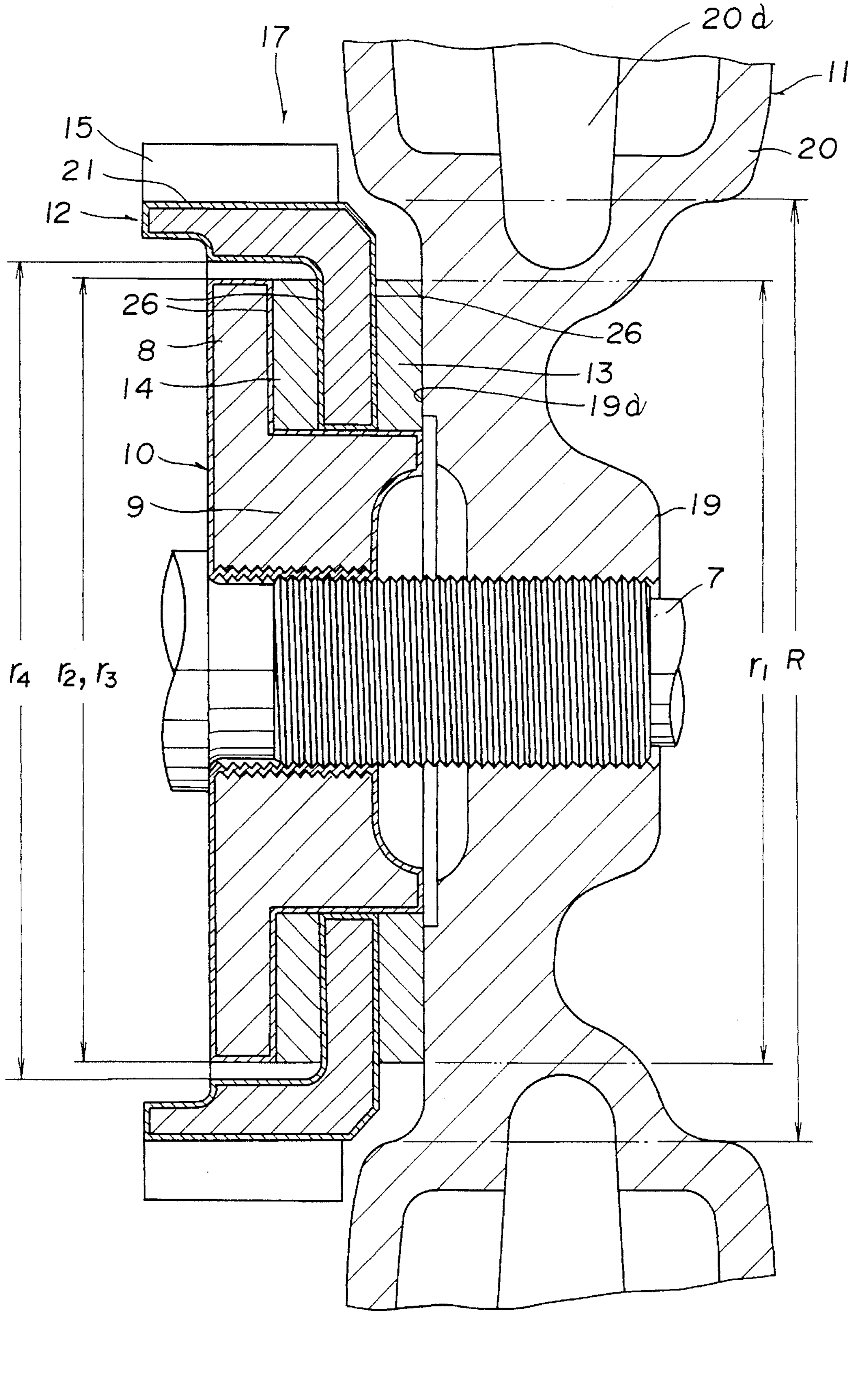
Figure 3:
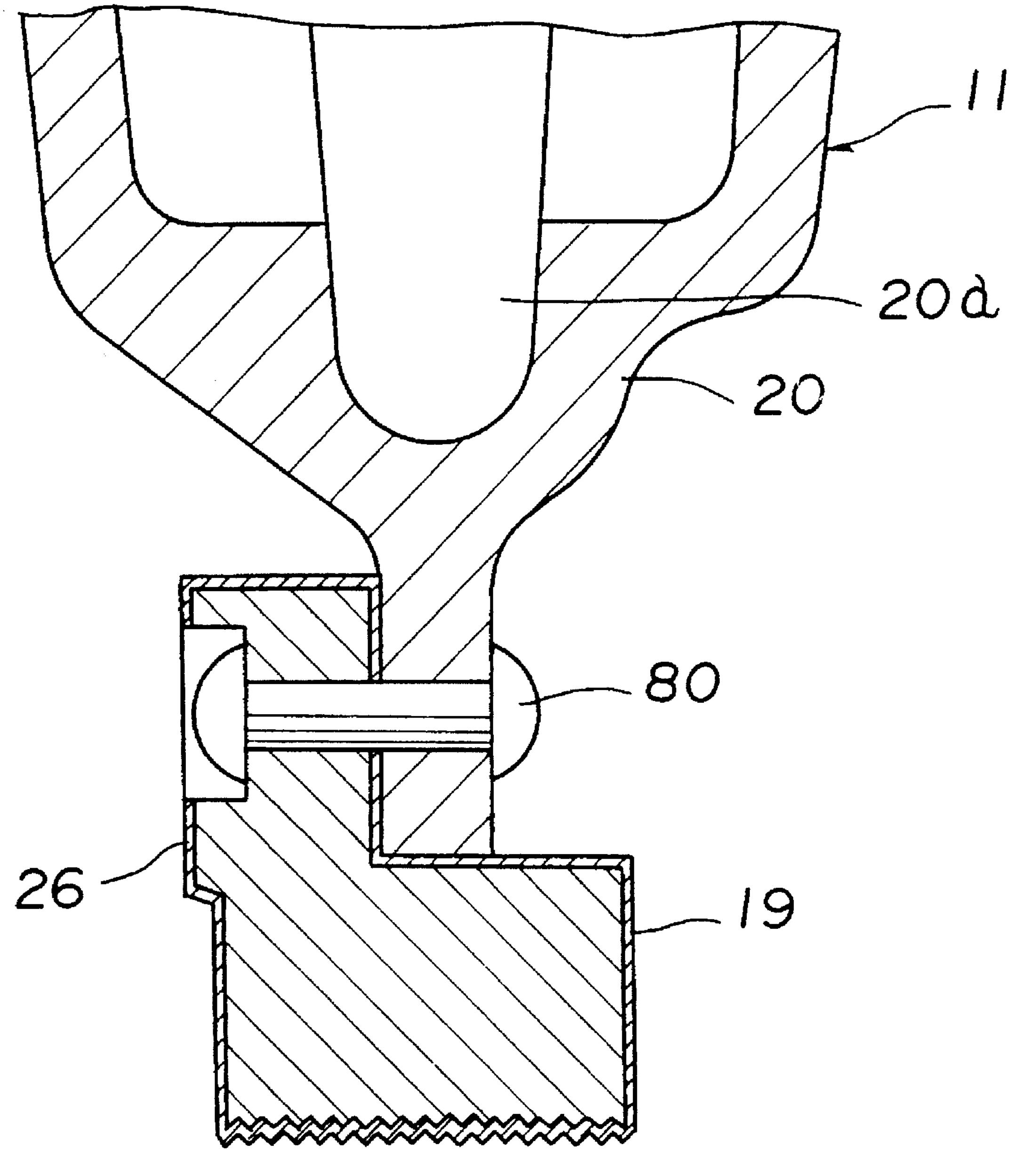
Figure 4:
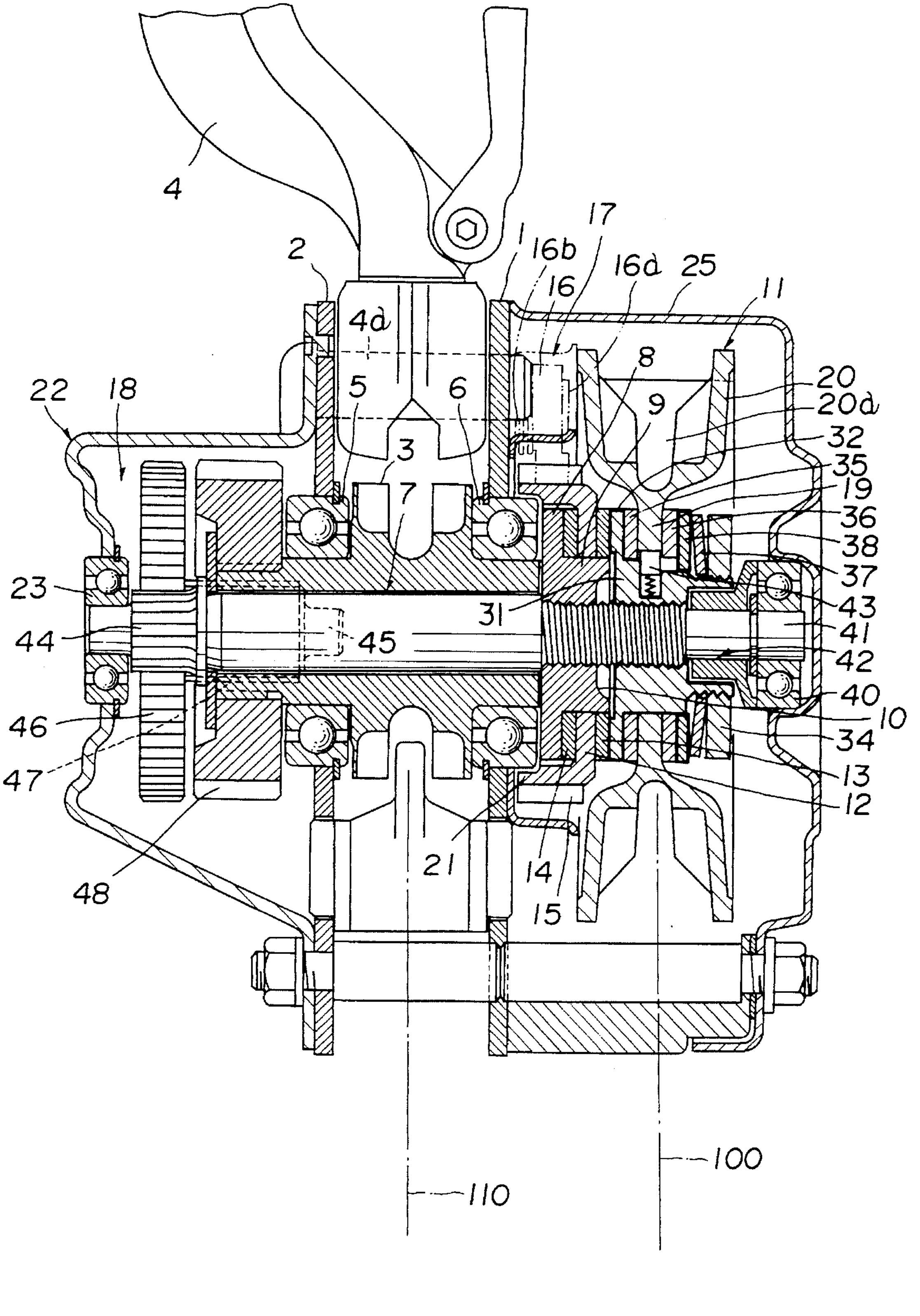
Figure 5:
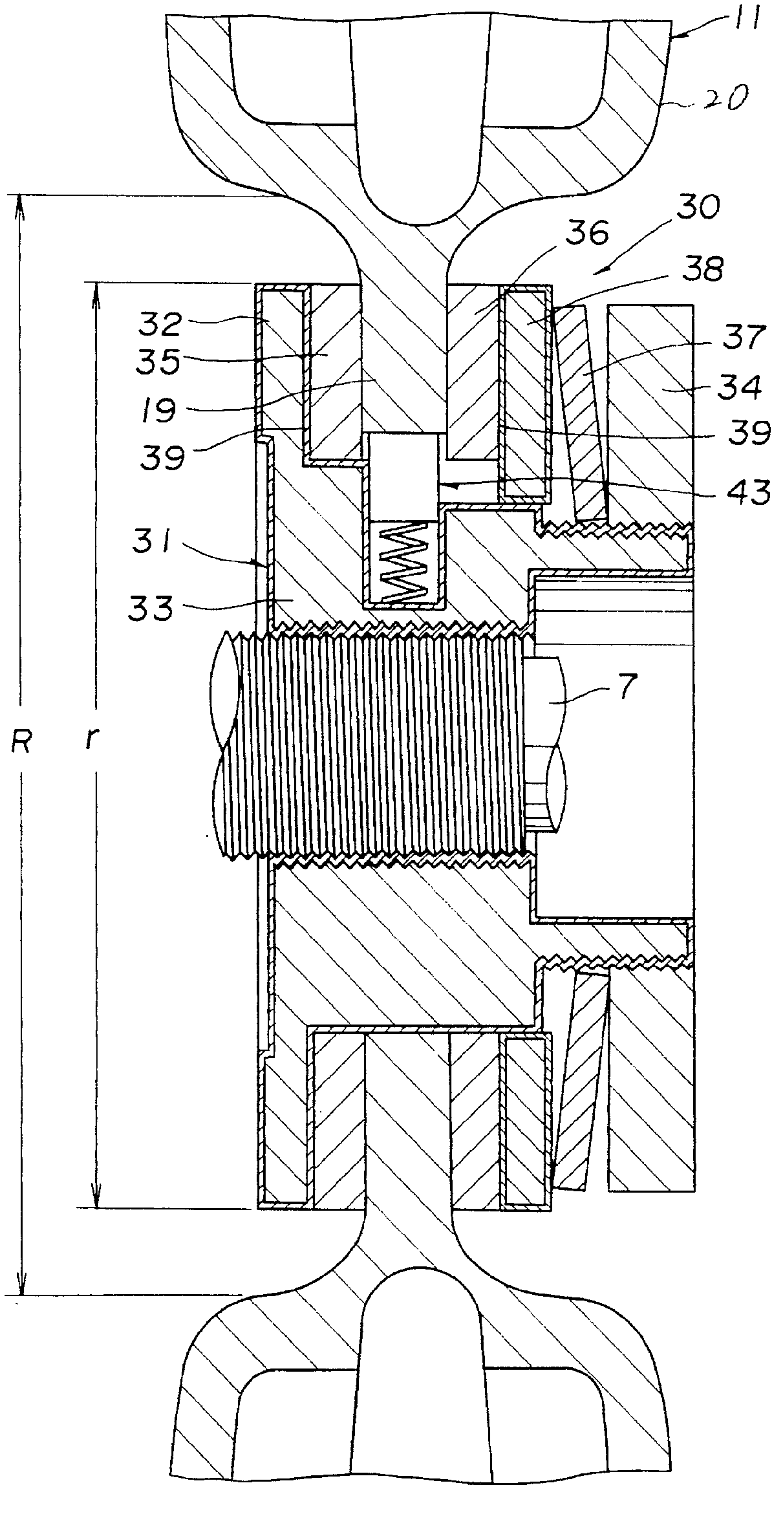
Figure 6:
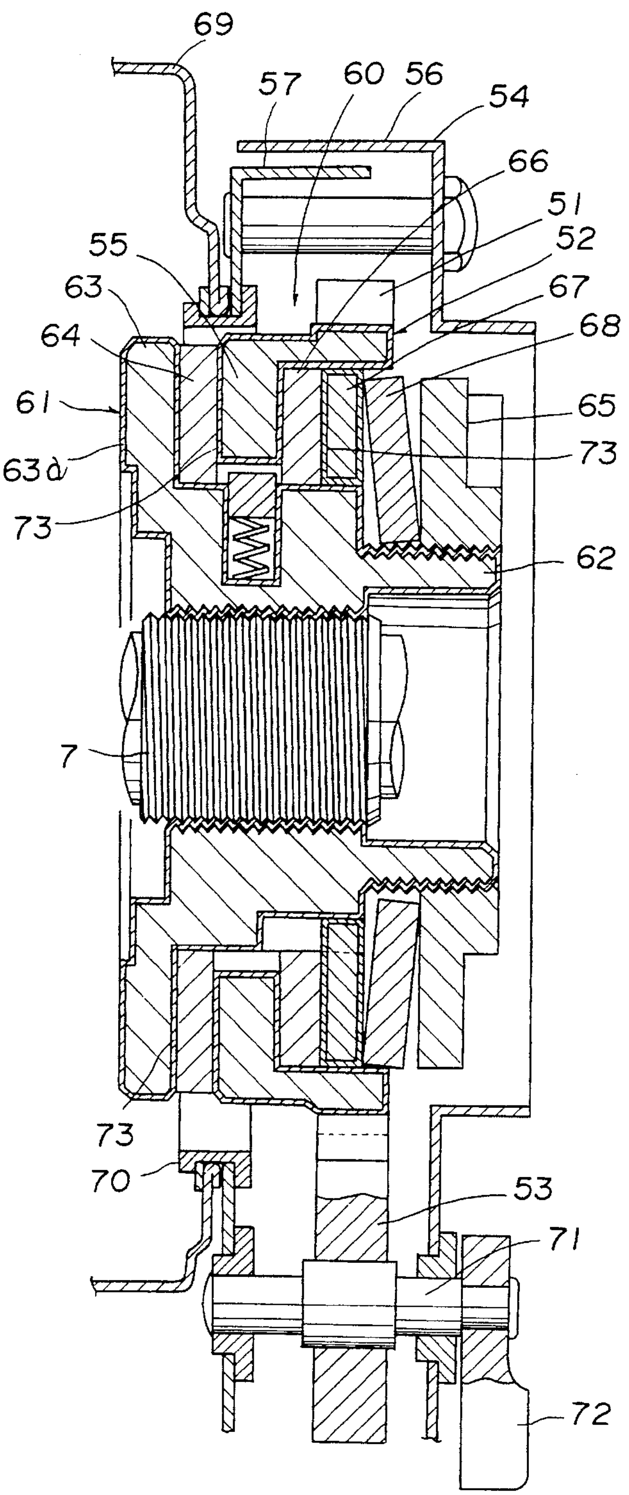
Figure 7:
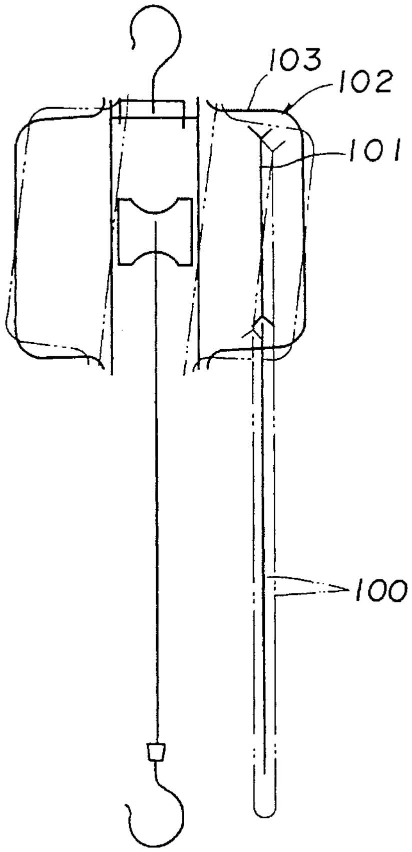

FIG. 1 is a partial longitudinal sectional view of a first embodiment of the present invention, FIG. 2 is an enlarged sectional view of a principal portion of an embodiment in which a friction control layer is provided at a friction surface of a mechanical brake, FIG. 3 is an enlarged sectional view of another example when the friction control layer is at the friction surface, showing a principal portion only, FIG. 4 is a partial longitudinal sectional view of a second embodiment of the present invention, FIG. 5 is an enlarged sectional view of the principal portion of a embodiment having a friction surface for an overload prevention device at the friction control layer, FIG. 6 is an enlarged sectional view of a third embodiment of the present invention, showing a principal portion and corresponding to FIG. 5, and FIG. 7 is a schematic illustration of the conventional example, showing the problem therein.

DETAILED DESCRIPTION OF THE INVENTION

A first embodiment of the present invention shown in FIG. 1 is a manual chain block having no overload prevention device, in which a mounting shaft **4*a* for mounting a hook 4 is provided between a pair of side plates 1 and 2, a load sheave 3 engageable with a load chain 110 is rotatably supported between the side plates 1 and 2 through bearings 5 and 6, a driving shaft 7 is inserted into a shaft bore of the load sheave 3, with one axial side of the driving shaft 7 is integrally coupled with a driven member 10 comprising a driven disc 8 and a cylindrical portion 9, a handwheel 11 is screwably mounted onto one axial end of the driving shaft 7, at the cylindrical portion 9 of the driven member 10 are supported a braking ratchet wheel 12 and first and second lining plates 13 and 14 positioned at both axial sides of the braking ratchet wheel 12, to the first side plate 1 is supported, through a pawl shaft 16*a* and a pawl spring 16*b*, a braking pawl 16 engageable with teeth 15 at the braking ratchet wheel 12, and the driven member 10, handwheel 11, braking ratchet wheel 12, braking pawl 16 and the pair of first and second lining plates 13 and 14, form a mechanical brake 17. Furthermore, at the other axial side of the driving shaft 7 is provided a reduction gear mechanism 18** having a plurality of reduction gears.

The above-mentioned construction is well-known, so that an endless hand chain 100 engageable with the handwheel 11 is operated to rotatably drive the handwheel 11 and a driving force is transmitted to the driving shaft 7 through operation of the mechanical brake 17 and the load sheave 3 can be driven through the reduction gear mechanism 18, whereby a load can be hoisted through the load chain 110 engageable with the load sheave 3.

The first embodiment of the invention shown in FIG. 1 is so constructed that in the manual chain block the handwheel 11 can be (a) made smaller in diameter, (b) located in a axial position closer to the first side plate 1, and reduced not only in diameter but also in an axial length, whereby, while the chain block can be miniaturized as a whole, deflection caused by a load acting on the handwheel 11 can be reduced and the entire chain block, when not-loaded, can be less slanted.

In detail, the handwheel 11 is provided at the axially inward facing surface of a boss 19 with a friction surface 19*a*, a wheel portion 20 in continuation of the boss 19 is axially extended toward the first side plate 1 with respect to the boss 19. At the wheel portion 20 are provided the minimum number of pockets **20*a* for receiving therein lateral links of the hand chain, the outer diameter of each pocket is made smaller, as shown in FIG. 2, an outer diameter $r_1$ of the first lining plate 13 and contact with the friction surface 19*a* is made smaller than an inner diameter R of the inside extended portion of the wheel portion 20, at the braking ratchet wheel 12 is provided a cylindrical portion 21 extending from the outer periphery thereof toward the load sheave 3 and overlapping on the outer periphery of the bearing 6, at the outer periphery of the cylindrical portion 21 are provided teeth 15 engageable with the braking pawl 16, the teeth 15 are displaced toward the load sheave 3 with respect to the inside extended portion of the wheel portion 20, an outer diameter $r_2$ of the second lining plate 14 and that $r_3$ of the driven disc 8 at the driven meber 10 are made smaller than an inner diameter of the cylindrical portion 21, and the first and second lining plates 13 and 14** are formed of the following lining raw material.

The lining raw material comprises heat resistant fiber, a friction regulating agent and a bonding agent, and has a coefficient of friction of 0.35 to 0.60 at a surface temperature of 200° C. of the respective friction surfaces, a hardness (HRS) of 90 to 120, a compressive strength of 1500 (kg/cm$^2$) or more, and a maximum strain of 12 ($10^{-3}$ mm/mm) or more.

In greater detail, in the first embodiment shown in FIG. 1, the number of pockets at the handwheel 11 is six, the outer diameters $r_1$ through $r_3$ of the first lining plate 13, second lining plate 14 and driven disc 8 at the driven member 10, are equal to each other, the outer diameters $r_1$ through $r_3$ being made smaller than an inner diameter R of the inside extended portion at the wheel portion 20 and smaller than an outer diameter of the bearing 6.

The heat resistant fiber constituting the first and second lining plates 13 and 14 uses inorganic fiber, such as, glass fiber, rock wool, metallic fiber, ceramic fiber, and carbon fiber; or organic fiber, such as, aramide fiber, acrylic fiber, or phenol fiber. The friction regulating agent uses powder or whiskers comprising metal, such as, iron, brass, copper, zinc, or aluminum; inorganic salt, such as, sulfate, barium sulfate, potassium carbonate, or potassium titanate; or inorganic material, such as, graphite or carbon; or organic material, such as, rubber, fluororesin, high molecular phenol resin, or cashew dust; and further the bonding agent uses a binder of resin material, such as, phenol resin, denatured phenol resin, polyimide resin, epoxy resin, cashew resin or melamine resin.

The heat resistant fiber is used as the aggregate and the friction regulating agent and bonding agent are mixed in the following ratio (volume %):

heat resistant fiber: 28 to 35 (V %)

friction regulating agent: 20 to 37 (V %)

bonding agent: 35 to 45 (V %).

The lining raw material is molded to the lining plates 13 and 14 and pressurized and heated. The lining plates 13 and 14 are each molded by mixing the materials in the above-mentioned ratio to be pressurized and heated to obtain the following performances:

hardness (HRS): 90 to 120 bending strength (Kgf/mm$^2$): 9 to 15 maximum strain ($10^{-3}$ mm/mm): 12 to 16 compressive strength (Kgf/mm$^2$): 15 to 20 coefficient of friction (200° C.): 0.35 to 0.60.

In addition, when the above-mentioned performance is compared with that of the usual brake lining of a resin series of non-asbestos, the strength, especially the compressive strength is stronger by 15 to 20%, which is obtained because the ratio (V %)of heat resistant fiber and bonding agent is 63 to 80% larger than the ratio of usual brake lining and then molded by being pressurized and heated. Such performance can enable one to miniaturize the lining plates 13 and 14 at the mechanical brake 17 which are tightened toward the driven disc 8 by forward screw movement of the handwheel 11 and have the function to transmit the driving force to the driving shaft 7.

Accordingly, since the lining plates 13 and 14 each are reduced in diameter more than the inner diameter R of the inside extended portion of the wheel 20 at the handwheel 11, the handwheel 11 can be smaller in diameter. Moreover, in the embodiment shown in FIG. 1, the cylindrical portion 21 of the braking ratchet wheel 12, as above-mentioned, is overlapped on the outer periphery of the bearing 6 so that the braking pawl 16 engageable with the teeth 15 at the cylindrical portion 21 can be displaced toward the first side plate 1, whereby together with this construction, the handwheel 11 can be made smaller in diameter and also its axial position can be displaced in closer proximity to the side plate 1. In brief, the first lining plate 13 and the boss of braking ratchet wheel 12 can be contained within the plane of projection of the inside surface of the wheel 20 at the handwheel 11, thereby enabling the chain block to be reduced in axial length to that extent.

Thus, since the handwheel 11 can be miniaturized and displaced to an axial position closer toward the side plate, and the chain block can be miniaturized as a whole. Moreover, the handwheel 11 can be axially positioned at the side-plate side, that is, near the bearing 6 at the side plate 1, whereby, when the handwheel 11 is driven by the hand chain, the driving shaft 7, even when subjected to a large hoisting load, can be restrained from deflection and a stable hoisting operation can be performed. Also, the entire chain block can be less slanted in the no-load state, so that, when the hand chain 100 is operated to rotate the handwheel 11 in the no-load state, the hand chain 100 can be prevented from coming into contact with the wheel cover 25 and thus be smoothly operated, thereby reducing noises. Also, the handwheel 11, when rotated by the hand chain 100, can be inertia-rotated, thereby enabling the handwheel 11 rotated by the hand chain 100 to quickly operate to that extent, and the hook of the load chain 110 to be quickly lifted.

In addition, in the above-mentioned construction, the number of pockets in the handwheel 11 is six, but may be five. A minimum number of pockets means that the number of pockets is increased by 1, in the case where, when the handwheel 11 is manually operated by the hand chain 100, variation in magnitude of manual power becomes large enough to deteriorate the operability, thereby lowering the efficiency. The number of pockets depends on the chain pitch of the hand chain, and, for example in the present chain there is a pitch of 23.5 at a line diameter of 5 mm or a 28.0 pitch at a line diameter of 6 mm, the minimum number of pockets is five.

The driving shaft 7 is supported at one axial end in a bearing 23 provided at a gear cover 22 for covering the reduction gear mechanism 18 and at the other axial end to a roller bearing 24 fitted into the shaft bore of the load sheave 3. In this case, a bearing may be provided at the wheel cover 25 for covering the handwheel 11 so that an extending shaft portion of the driving shaft 7 may be supported by the bearing.

Furthermore, it is preferable that in the above-mentioned construction, the friction surfaces of the braking ratchet wheel 12 and driven disc 8 of the driven member 10, with which the first and second inner plates 13 and 14 axially biased by forward screw movement of the handwheel 11 come into frictional contact, are, as shown in FIG. 2, provided plated layers of nickel phosphate, nickel chromium, or chromium, of 8 to 20 micron thick, the plated layers being heat-treated to form friction control layers 26 respectively.

The friction control layers 26 each are not merely a plated layer, but are formed by heat-treating the plated layer by a heating furnace at a temperature of 300° to 400° C., or at the austenite transformation point temperature of, for example, 850° C. of each member constituting the friction surface, and by diffusing and permeating the plated layer into the raw material of each member. Hence, the heat treatment raises the surface hardness and improves the attack resistance, and the coefficient of friction can be controlled to a predetermined value. Moreover, variation between similar products can be reduced, and, even when used for a long time, the coefficient of friction of the friction surface can be stably maintained to enable the braking property to be prevented from deterioration after a long use and stable use to be performed for a long time.

In addition, it is preferable that the friction control layer 26 is provided also at the friction surface 19*a* of the handwheel 11. In this case, a plated layer may be formed on the entire surface of the handwheel 11, but, as shown in FIG. 3, the boss 19 and wheel 20 may be independently formed and then coupled with a rivet 80 or the like, so that the plated layer is provided on the entire surface of the boss 19. Or, a contact plate (not shown) provided with the friction control layer is separately formed so as to be integrally coupled with the boss 19 by riveting, a fixing method using adhesive, or the like. Thus, the friction control layer 26 is provided at the friction surface 19*a* of the handwheel 11, so that, when the mechanical brake 17 is released, that is, when the handwheel 11 is screwably backward moved to release the operation of mechanical brake 17, such releasing is smooth, thereby eliminating the inconvenience that the friction surface 19*a* is caught onto the lining plate 13 to cause non-release of the mechanical brake 17. Also, in the case where the plated layer is heat-treated at the austenite transformation point temperature, it is preferable that the plated layer is quenched with cold water or cold oil after the heat treatment and thereafter is tempered at a temperature of 200° to 500° C., and preferably at 300° to 450° C., so as to be formed to a martensite structure.

Next, explanation will be given on a second embodiment of the present invention shown in FIG. 4. The second embodiment assembles an overload prevention device 30 in the chain block of the first embodiment, in which the handwheel 11 is provided with a brake holder 31 screwably mounted on the driving shaft 7 and comprising a flange 32 having at the inside a friction surface and a cylindrical portion 33, to which a boss 19 of the handwheel 11 is rotatably supported and to which a load setting and adjusting member 34 is screwably mounted, between the flange 32 of the brake holder 31 and the boss 19 is interposed a first friction plate 35 and between the boss 19 and the load setting and adjusting member 34 is interposed a second friction plate 36, and between the second friction plate 36 and the load setting and adjusting member 34 is interposed an elastic member 37 mainly comprising a disc spring, thereby forming the overload prevention device 30.

In the above-mentioned construction, outer diameters r of the flange 32 and friction plates 35 and 36, of the elastic member 37 and load setting and adjusting member 34, and of the holder 38 interposed between the second friction plate 36 and the elastic member 37 at the brake holder 31, are made smaller than the inner diameters R of the inside and outside extended portion of the wheel 20 at the handwheel 11, so that the overload prevention device 30 may be contained within the plane of projection of both axial side surfaces at the wheel 20 of the handwheel 11.

Although the friction surfaces 35 and 35 may use known friction plates, it is preferable to use the same lining raw material as the lining plates 13 and 14 at the mechanical brake 17.

In this case, it is preferable that the friction surfaces of the members with which the friction plates 35 and 36 come into frictional contact, in other words, the friction surface of the flange 32 at the brake holder 31 and that of the holder 38 are, as shown in FIG. 5, provided with friction control layers 39 formed of plated layers of nickel phosphate, nickel chromium or chromium, and of 8 to 20 micron thick and heat-treated.

The friction control layers 39 each are not merely the plate layer which are the same as those layers 26 at the friction surfaces of the mechanical brake 17, but are formed in such a manner that the plated layer is heat-treated in a heating furnace at a temperature of 300° to 400° C., or at the austenite transformation point temperature of, for example, 850° C. of the above-mentioned members for constituting the friction surfaces, and diffused and permeated into the raw material of each member, whereby the surface hardness can be raised and corrosion attack resistance can be improved by the heat treatment and also the coefficient of friction can be controlled to reduce variation between similar products.

It is preferable that the friction control layers are formed also at the friction surfaces at both sides the boss 19 of the handwheel 11.

In this case, a plated layer may be formed at the entire surface of the hand wheel 11 for this purpose, but a friction plate provided with the friction control layer may be separately formed so that the friction plate may be integrally coupled with the boss 19 by riveting or a fixing method with adhesive.

The aforesaid embodiments both are applied to the manual chain block which uses the handwheel 11 so as to operate the hand chain 100 for driving the load sheave 3. Besides this, they are applicable to a lever type hoist and traction machine comprising, as the driving member a driving gear 52 having at the outer periphery thereof teeth 51 and an operating lever 54 having a driving pawl 53 engageable with the teeth 51 at the driving gear 52 as shown in FIG. 6.

The lever type hoist and traction machine shown in FIG. 6, is the same as the second embodiment shown in FIG. 4, and has an overload prevention device 60. The overload prevention device 60 is provided with a brake holder 61 separate from the driving gear 52, a boss 55 thereof is rotatably supported to a cylindrical portion 62 of the brake holder 61, a first friction plate 64 is interposed between a flange 63 of the brake holder 61 and the boss 55 of the driving gear 52, a load setting and adjusting member 65 is screwably mounted onto the cylindrical portion 62, between the adjusting member 65 and the boss 55 of the driving gear 52 is interposed a second friction plate 66, and between the second friction plate 66 and the load settling and adjusting member 65 is interposed a holding plate 67 having a friction surface and an elastic member 68 formed mainly of a disc spring.

In FIG. 6, the brake holder 61, is the same as the second embodiment, is screwably mounted to the driving shaft 7, and a mechanical brake is provided at the lateral side facing the first side plate, that is, at the left side in FIG. 6, and at the left side surface of the flange 63 at brake holder 61 is provided a friction surface 63*a* coming in frictional contact with the first lining plate at the mechanical brake.

The operating lever 54 is elongated and couples a pair of lever plates 56 and 57 opposite to each other through bolt. The lever plate 57 is rotatably supported through a bearing member 70 to a brake cover 69 fixed to the first side plate 1 and for covering the mechanical brake, and in the vicinity of the supporting portion of lever plate 57 it supports the driving pawl 53 through a pawl shaft 71 so as to be capable of being positioned at three positions of hoist and traction, lowering and releasing traction, and a neutral position, so that an operating lug 72 fixed to the axial end of pawl shaft 71 is operated to switch the driving pawl 53 to the three positions.

In a third embodiment of the invention shown in FIG. 6, onto the entire surfaces of the brake holder 61, driving gear 52 and holding plate 67 are formed plated layers of nickel phosphate, nickel chromium or chromium and of 8 to 20 micron thick by means of electrolytic plating, and then heat-treated for 1 to 2 hours at a temperature of 300° C. by a heating furnace, so as to form a friction control layer 73 of the surface hardness of Vickers hardness of 350 to 450.

Thus, the friction control layers 73 are formed at the surfaces of the brake holder 61, driving gear 52 and holding plate 67 at the driving side and opposite to the friction plates 64 and 66, and can control the surface condition, that is, the coefficient of friction with respect to the surface of raw material is the same as the second embodiment. Moreover, variation between the products can be reduced and the adjusting member 65 is tightened to set a transmitting torque, whereby the set value can properly be held, an overload of more than the set transmitting torque can ensure a slip of the load sheave, and effective overload prevention can be realized.

Moreover, the friction control layer 73 is not a mere plated layer, but it is formed by heat-treating a plated layer, whereby the surface hardness can be raised and the coefficient of friction be lowered to that extent to be constantly controlled. Hence, the transmitting torque can further accurately be set and variation between the products is eliminated, and also the surface condition of the layer 73, that is, the coefficient of friction, can be prevented from being varied due to corrosive attack on the first and second friction plates 64 and 66, and is not affected by generation of rust, thereby enabling the set transmitting torque to be held in a proper value for a long time.

The heat treatment of the above-mentioned plated layer is performed by a heating furnace at a temperature of 300° C. However, the plated layer may be heat-treated by the heated furnace at a temperature 400° C. for 1 to 2 hours. In this case, the surface hardness of the friction control layer 100 can be Vickers hardness of 400 to 450.

Furthermore, the heat treatment temperature of the plated layer, is the same as the second embodiment, may be set to an austenite transformation point temperature of, for example, 850° C., of the raw material (structural steel) constituting the brake holder 61, driving gear 52 and holding plate 67, and the plated layer is diffused and permeated into the raw material, whereby the diffused and permeated layer may form the friction control layer 73.

In this case, the heat treatment may be carried out at the heating furnace, but is preferable to be done by high frequency induction heating. Also, the plated layer is preferred to be quenched by cold water or cold oil after the heat treatment and then tempered usually at a temperature of 300° to 450° C. to be formed in martensite structure.

Thus, the friction control layer 100 can have the surface hardness of Vickers hardness of 600 or more, for example, 800 through 1000.

The first and second lining plates used for the mechanical brake in the third embodiment shown in FIG. 6, are the same as the first and second embodiments, use the lining raw material respectively. Also, in the third embodiment, the brake holder 61 and driving gear 52 can be smaller in diameter. Accordingly, the operating lever 54 can further be miniaturized and the brake holder 61, driving gear 52 and operating lever 54 can be axially positioned to proximity to the first side plate.

Although several embodiments have been described, they are merely exemplary of the invention and not to be constructed as limiting, the invention being defined solely by the appended claims.

What is claimed is:

1. A manual hoist and traction machine comprising:

first and second side plates;

a load sheave supported between said first and second side plates by first and second bearings;

a driving shaft for driving said load sheave;

a driven member coupled with said driving shaft and having a friction surface;

a driving member threadedly mounted to said driving shaft and having a friction surface opposite to the friction surface of said driven member; and a mechanical brake provided between said driven member and said driving member and comprising a braking ratchet wheel having friction surfaces at both axial sides; a braking pawl engageable with said braking ratchet wheel at an outer periphery thereof; first and second lining plates interposed between the friction surfaces of said driven member and braking ratchet wheel and between the friction surfaces of said braking ratchet wheel and driving member, respectively, wherein said lining plates comprise heat resistant fiber, a friction regulating agent and bonding agent which are mixed in the following ratio:

heat resistant fiber: 28 to 35 (V %)
friction regulating agent: 20 to 37 (V %)
bonding agent: 35 to 45 (V %)

and have the following resulting characteristics:

hardness (HRS): 90 to 120
bending strength (Kgf/mm$^2$): 9 to 15
maximum strain ($10^{-3}$ mm/mm): 12 to 16
compressive strength (Kgf/mm$^2$): 15 to 20
coefficient of friction (200° C.): 0.25 to 0.60.

2. A hoist and traction machine according to claim 1, wherein said driving member comprises a handwheel provided with a wheel and boss threadedly mounted to said driving shaft and a hand chain engageable with said wheel of said handwheel, a side surface of said boss at the mechanical brake side having a friction surface, said wheel having a minimum number of pockets for receiving therein horizontal links of said hand chain and said wheel having an inside extending portion extending inwardly from said boss so as to be displaced toward said first side plate with respect to said friction surface at said boss, said hoist and traction machine being so assembled that:

an outer diameter of said first lining plate is smaller than an inner diameter of said inside extending portion at said wheel;

said braking ratchet wheel being provided with a cylindrical portion extending from the outer periphery of said ratchet wheel toward said side plate, the outer periphery of said cylindrical portion being provided with teeth with which said braking pawl comes into contact, said teeth being displaced toward said first side plate with respect to said inside extending portion of said wheel, and outer diameters of said second lining plate and driven member being provided with said friction surface which are smaller than an inner diameter of said cylindrical portion at said braking ratchet wheel.

3. A manual hoist and traction machine according to claim 2, wherein said cylindrical portion of said braking ratchet wheel is partly extended inwardly beyond an outer periphery of said first bearing by which said load sheave is supported to said first side plate.

4. A manual hoist and traction machine according to claim 2, wherein the friction surfaces on at least said driven member and braking ratchet wheel with which said first and second lining plates are axially biased by forward screw movement of said handwheel so as to come into frictional contact are provided with friction control layers comprising plated layers, said plated layers being heat-treated.

5. A manual hoist and traction machine according to claim 1, wherein said driving member comprises a brake holder screwably mounted to said driving shaft and having a cylindrical portion and a flange having at the inside-thereof a friction surface, a handwheel having a boss having at both axial sides thereof friction surfaces and an inside extending portion and rotatably supported to said cylindrical portion of said brake holder, and a hand chain engageable with said handwheel, to said cylindrical portion at said brake holder is screwably mounted a load setting and adjusting member, a first friction plate is interposed between said flange of said brake holder and said boss of said handwheel, a second friction plate is interposed between said boss and said load setting and adjusting member, and a holding plate and an elastic member are interposed between said second friction plate and said load setting and adjusting member, thereby forming an overload prevention device, and outer diameters of said flange at said brake holder and first and second friction plates are made smaller than an inner diameter of said inside extending portion at said handwheel.

6. A manual hoist and traction machine according to claim 5, wherein the outer diameter of said elastic member, holding plate and load setting and adjusting member at said overload prevention device are made smaller than the inner diameter of said extending portion at the an axially outside surface, and said overload prevention device is contained within the plane of projection of both said axial surfaces at said wheel of said handwheel.

7. A manual hoist and traction machine according to claim 5, said friction surfaces of at least said flange of said brake holder and holding plate among said friction surfaces with which said first and second friction plate come into frictional contact are provided with friction control layers comprising heat-treated plated layers.

8. A manual hoist and traction machine according to claim 1, wherein said driving member comprises a brake holder having a cylindrical portion and screwably mounted to said driving shaft and having a cylindrical portion and a flange having at the inside surface a friction surface, a driving gear which has a boss having at both axial sides friction surfaces, and teeth positioned at the outer periphery; and an operating lever having a driving pawl engageable with said teeth at said driving gear, to said cylindrical portion of said brake holder is screwably mounted a load setting and adjusting member, between said flange of said brake holder and the boss of said driving gear is interposed a first friction plate, between said boss of said driving gear and said load setting and adjusting member is interposed a second friction plate, and between said second friction plate and said load setting and adjusting member are interposed a holding plate having a friction surface and an elastic member to thereby form an overload prevention device, and at the friction plates of said flange at said brake holder, driving gear, and holding plate, are each provided with a friction control layer formed of a plated layer which is heat-treated.

9. A manual hoist and traction machine according to claim 8, wherein said friction control layer each are formed of nickel phosphate, nickel chromium, or chromium.

10. A manual hoist and traction machine according to claim 8, wherein the heat treatment temperature of said plated layer is set to an austenite transformation point temperature of raw material of each of said brake holder, driving gear and holding plate, and said plated layer is diffused onto the surface of said each raw material.

* * * * *